United States Patent [19]
Kuhn et al.

[11] Patent Number: 6,050,187
[45] Date of Patent: Apr. 18, 2000

[54] WIPING CYLINDER DRIVE OF AN INTAGLIO PRINTING MACHINE

[75] Inventors: Hermann Josef Kuhn, Zellingen; Johannes Schaede, Wuerzburg, both of Germany

[73] Assignee: De La Rue Giori S.A., Lausanne, Switzerland

[21] Appl. No.: 09/065,205

[22] Filed: Apr. 23, 1998

[30] Foreign Application Priority Data

May 29, 1997 [CH] Switzerland .............................. 1268/97

[51] Int. Cl.⁷ .................................. B41F 9/08; B41F 9/10
[52] U.S. Cl. ............................................................ 101/155
[58] Field of Search .................................... 101/155, 156, 101/153, 154, 161, 216, 157

[56] References Cited

U.S. PATENT DOCUMENTS 3,762,319  10/1973  Gazzola et al. ......................... 101/155

FOREIGN PATENT DOCUMENTS 1160538A  8/1969  Germany .
2065561   7/1981  United Kingdom .

*Primary Examiner*—Kimberly Asher
*Attorney, Agent, or Firm*—Pitney, Hardin, Kipp & Szuch, LLP

[57] ABSTRACT

The wiping cylinder drive has a drive shaft (4) which is independent of the wiping cylinder shaft (2) and which, at its end facing away from the wiping cylinder, is connected to the drive member (15) with the aid of a claw coupling (10). Inserted between the adjacent claws of the constantly engaged claw coupling (10) is a gearwheel (20) which is made of elastically deformable material and the teeth (21) of which are in each case inserted positively between the flanks of adjacent claws of the two coupling parts and, in the case of sudden changes in the load torque of the wiping cylinder, function as damping elements. The drive member (15) has a gearwheel (17) which is constantly in engagement kinematically with the gear leading to the main motor of the printing machine.

9 Claims, 4 Drawing Sheets

WIPING CYLINDER DRIVE OF AN INTAGLIO PRINTING MACHINE

FIELD OF THE INVENTION

The invention relates to a wiping cylinder drive of an intaglio printing machine, with a drive shaft setting the wiping cylinder in rotation and with a drive member setting this drive shaft in rotation.

PRIOR ART

Wiping cylinder drives of this type are known and are described, for example, in U.S. Pat. No. 3,762,319.

Wiping cylinders serve for removing ink from the surface of the inked printing plates outside the intaglio cuts prior to the actual printing operation and for simultaneously pressing the ink into the intaglio cuts. For this purpose, the wiping cylinder bears on the plate cylinder under relatively high pressure and has the same direction of rotation as the plate cylinder, so that the circumferential speeds of the two cylinders at the contact line are in opposition, in order to achieve satisfactory wiping.

In sheet fed printing machines, in which the plate cylinder has printing saddles which are separated by cylinder pits and onto which the printing plates are stretched, the wiping cylinder is subjected, whenever it runs onto a printing saddle or leaves the printing saddle, to a suddenly rising or falling torque which increases abruptly from approximately 0 Nm to approximately 2500 Nm and then decreases again to 0 Nm; at the current speeds of modern printing machines, this sudden change in the load torque takes place 2.78 times per second. Apart from the mechanical stress on the elements of the wiping cylinder drive, a considerable level of noise is also generated thereby. In the case of wiping cylinder drives known hitherto, no measures are provided for reducing the abovementioned adverse effects.

SUMMARY OF THE INVENTION

The object on which the invention is based is to reduce the effects of the sudden changes in load torque of the wiping cylinder on the wiping cylinder drive and the kinematic connection to the drive motor of the printing machine.

This object is achieved, according to the invention, in that the drive shaft and the drive member are coupled to one another, with elastically deformable damping means being interposed.

In the event of a sudden change in the torque, these damping means cushion the forces which act on the drive member and on the kinematic chain connecting the latter to the motor of the printing machine, and at the same time the noise level is thereby lowered.

When there is an interruption in the printing operation, a wiping cylinder must be capable of being moved away from the plate cylinder, that is to say it has to be radially adjustable. The wiping cylinder drive must satisfy this condition and be designed in such a way that it allows radial displacement of the wiping cylinder.

In order to meet this requirement, in a preferred exemplary embodiment a drive shaft is provided which is independent of the wiping cylinder shaft, is capable of being coupled to and uncoupled from the wiping cylinder shaft with the aid of a disengageable coupling and is mounted, at its end facing away from the wiping cylinder, in a pivot bearing on one side, in such a way that it is freely pivotable radially about this bearing and thus, when in the coupled state, can follow the radial adjusting movement of the wiping cylinder shaft.

Expedient refinements of the invention emerge from the dependent claims.

BRIEF DESCRIPTION OF THE DRAWINGS

The invention is explained in more detail with reference to two exemplary embodiments by means of the drawings in which.

DESCRIPTION OF THE PREFERRED EMBODIMENTS

Figure 1:
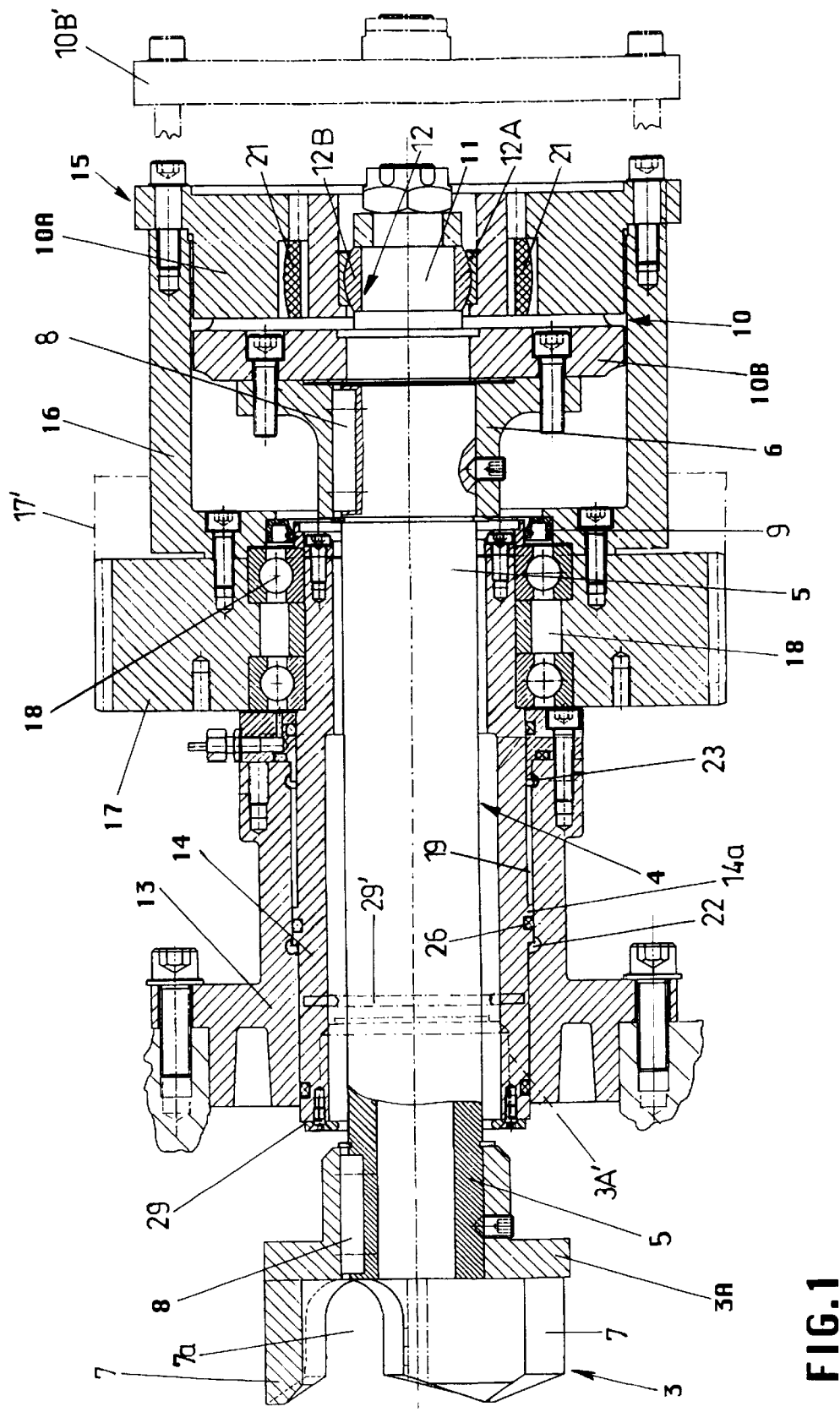
FIG. 1 shows, in section, a first embodiment of a wiping cylinder drive according to the invention, the parts which belong to the wiping cylinder not being illustrated.
Figure 2:
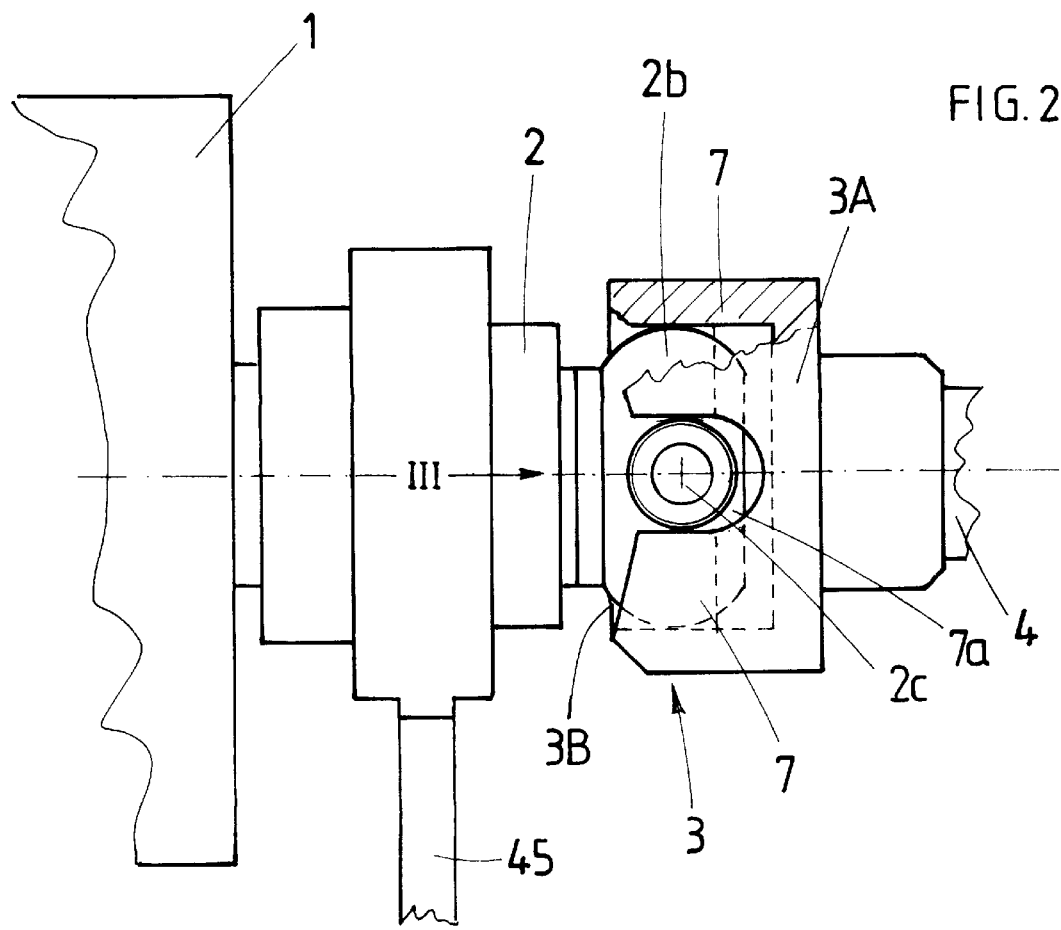
FIG. 2 shows the interengaging coupling parts of the drive shaft and wiping cylinder in the coupling position.

In the example under consideration according to FIGS. 1 and 2, the wiping cylinder 1 of an intaglio printing machine not illustrated in any more detail, said wiping cylinder being indicated only partially in FIG. 2, can be coupled to or uncoupled from the gear leading to the main motor of the printing machine, with the aid of a drive shaft 4 separate from the wiping cylinder shaft 2 and by means of an axial displacement of this drive shaft. The wiping cylinder shaft 2 is mounted in the walls of a wiping fountain 45 in a way known per se.

The drive shaft 4, which is in the extension of the wiping cylinder shaft 2, is itself set in rotation by means of a drive member 15 (FIG. 1) which is constantly connected kinematically to the main motor of the printing machine.

This drive shaft 4 consists of a shank 5 which, at its end facing the wiping cylinder 1, carries the input part 3A of a disengageable coupling 3 for rotationally fixed connection to the wiping cylinder shaft 2, and of a hub 6 which is fastened to the other shank end and to which is fastened the output part 10B of a claw coupling 10, by means of which the drive shaft 4 is constantly coupled to the drive member 15, as described in more detail later. Drive elements 8 serve for the rotationally fixed connection of the coupling part 3A to the shank 5 and of the coupling part 10B to the hub 6 of the drive shaft 4.

Figure 3:
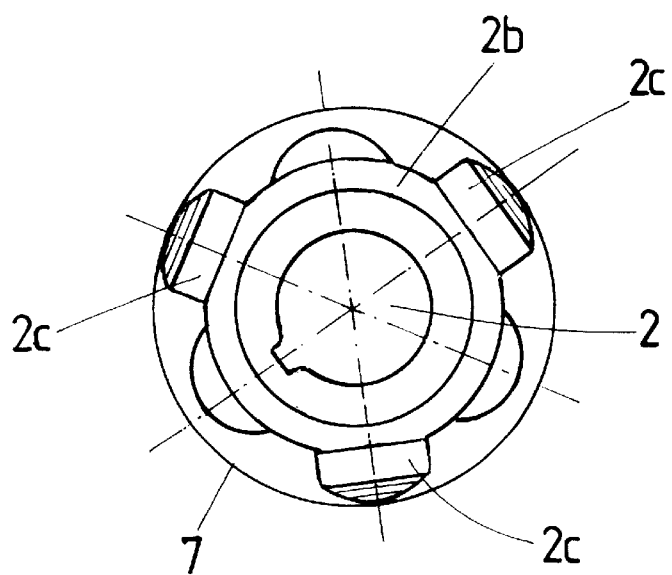
FIG. 3 shows a view of the coupling in the direction of the arrow III in FIG. 2.

The input part 3A of the coupling 3 is provided, in the manner of a claw coupling part, with axially projecting claws 7 which delimit U-shaped orifices 7a located between them. In the example under consideration, as shown in FIGS. 2 and 3, the output coupling part 3B of the coupling 3, said output coupling part being fastened to the end of the wiping cylinder shaft 2, consists of a spherical, that is to say convexly designed shaft stub 2b and three guide rollers 2c which are rotatably mounted on the latter and which are distributed in a star-shaped manner over the circumference of the shaft stub 2b and project radially from the latter. In the coupling position of the coupling 3, which is shown in FIG. 2, the claws 7 of the coupling part 3A of the drive shaft 4 engage round the spherical shaft stub 2b of the wiping cylinder shaft 2, and the guide rollers 2c engage into the U-shaped orifices 7a of the coupling part 3A for the rotationally fixed connection of the two coupling parts, said guide rollers functioning as supporting rollers. In FIG. 1, the coupling position of the drive shaft 4 together with its coupling part 3A is illustrated by unbroken lines, the parts which belong to the wiping cylinder 1 not being shown, and dot and dash lines indicate the uncoupling position which is displaced to the right according to FIG. 1 and in which the coupling part 3A assumes the position 3A'.

The output part 10B of the coupling 10 at the rear end of the drive shaft 4 has an axially projecting journal 11, on which the convex bearing face 12B of a pendulum bearing or pivot bearing 12 is mounted. As also described in more detail later with reference to FIG. 4, this output part 10B engages into the input part 10A belonging to the drive member 15, with elastically deformable means 20, 21 being interposed. This input part 10A has, inside it, a convex bearing face 12A which belongs to said pendulum bearing 12 and which is supported on the convex bearing face 12B of the output part 10B of the claw coupling 10.

The shank 5 of the drive shaft 4 passes with radial play through a sleeve 14 which is mounted axially displaceably in a bush 13 of the machine stand and on which the drive member 15 is mounted rotatably. This drive member 15 consists of the coupling input part 10A already mentioned, which forms a drive flange, of a flanged bush 16 which is fastened to the radially projecting outer edge of this drive flange and which surrounds with play the output part 10B of the claw coupling 10, and of a gearwheel 17 which is fastened laterally to this flanged bush 16 and which is mounted rotatably on the sleeve 14 by means of ball bearings 18. This gearwheel 17 is in engagement with a drive pinion, not illustrated, of the gear leading to the main motor of the machine. The drive member 15 is constantly connected kinematically to the main motor of the printing machine. Inserted between the flanged bush 16 and the rear end of the sleeve 14 is a sealing ring 9 which prevents the lubricant for the ball bearings 18 from escaping outward.

Figure 4:
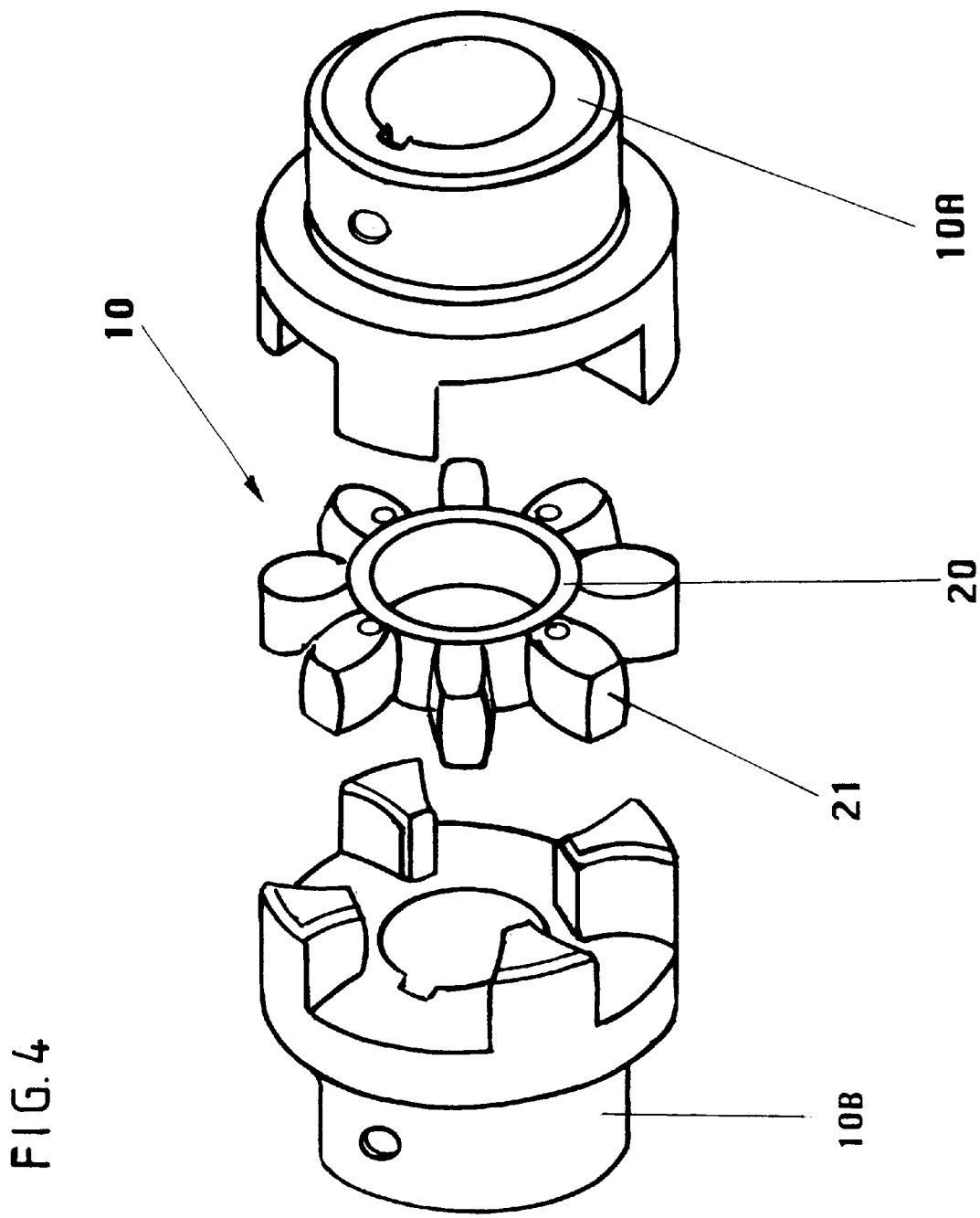
FIG. 4 shows the three parts of the claw coupling which connects the drive shafts to the drive member and which is shown in FIG. 1, in an exploded perspective illustration.

FIG. 4 shows the parts of the claw coupling 10, specifically, in a separated perspective illustration, the input part 10A, the output part 10B and the elastically deformable damping means inserted between the two coupling parts and taking the form of a gearwheel 20 which consists of elastically deformable material and the teeth 21 of which in each case engage between two adjacent claws of the claw coupling 10 which is constantly in the coupled state. The elastically deformable teeth 21 of the gearwheel 20 thus form a damping means and are positively embedded between the flanks of the claws of the two coupling parts. The damping effect is brought about by the elastic deformation of the teeth of the gearwheel, specifically, in each case, when there is a suddenly rising and falling or alternating load on the wiping cylinder drive.

In this way, when there is a sudden change in the load torque of the wiping cylinder and therefore of the drive shaft 4, the teeth 21 of the gearwheel 20 cause damping of the forces which act on the drive member and on the following parts of the kinematic chain leading to the main motor. In particular, due to the elastic deformability of the gearwheel, when there is a sudden change in the torque the drive shaft 4 can briefly rotate somewhat relative to the drive member 15, so that the sudden change in torque is not transmitted to the drive member 15. Simultaneously, the noise of the claw coupling, which is conventionally generated as a result of the interengagement of the claws of the two coupling parts, is substantially damped.

Since the drive shaft 4 is mounted on only one side by means of the pendulum bearing 12, the drive shaft 4 is freely pivotable within the sleeve 14 radially about this bearing within a limited range and consequently, when in the coupled state, can unconstrainedly follow the position of the wiping cylinder during the radial adjustment of the latter, since the front coupling parts 3A and 3B of the coupling 3 are also pivotable somewhat relative to one another on account of the mounting of the claws 7 on the convex shaft stub 2B of the wiping cylinder. Moreover, the pivot bearing formed by the pendulum bearing 12 provides support in the axial direction. In the uncoupled state, the front end of the drive shaft 4 is supported on the supporting ring 29 mounted on the end face of the sleeve 14.

The subassembly consisting of the drive shaft 4 with the coupling parts 3A and 10B, of the drive member 15 and of the sleeve 14 can be displaced axially with the aid of a hydraulic actuating drive, in order to couple the drive shaft 4 to the end of the wiping cylinder shaft 2 or uncouple it from this wiping cylinder end, as already described with reference to FIGS. 1 to 3. For this purpose, between the outer circumference of the sleeve 14 and the stand bush 13 is provided an annular gap 19 which extends over a specific part of their length and into which a radial annular projection 14a on the outer circumference of the sleeve 14 projects. This annular projection 14a is sealed off relative to the inner circumference of the stand bush 13 by means of an O-ring 26.

The mutually opposite annular flanges on both sides of the annular projection 14a function as piston faces. Hydraulic connections 22 and 23 indicated in FIG. 1 are provided at both ends of the annular gap 19. When a hydraulic pressure medium is introduced via the hydraulic connection 23, the sleeve 14, together with said axially moveable subassembly, is displaced to the left into the coupling position illustrated in FIG. 1, whilst at the same time the pressure medium located on the other side of the annular projection 14a can flow off through the connection 22. Conversely, if pressure medium is introduced through the connection 22, the flank of the annular projection 14a on the left in FIG. 1 is acted upon and the sleeve 14, together with the entire said subassembly, is displaced to the right into the uncoupling position.

In this uncoupling position which, as already mentioned, is indicated by dot and dash lines in FIG. 1, the input part 3A of the coupling 3, the supporting ring 29, the input part 10A of the claw coupling 10 and the gearwheel 17 assume the positions 3A', 29', 10B' and 17' respectively.

Figure 5:
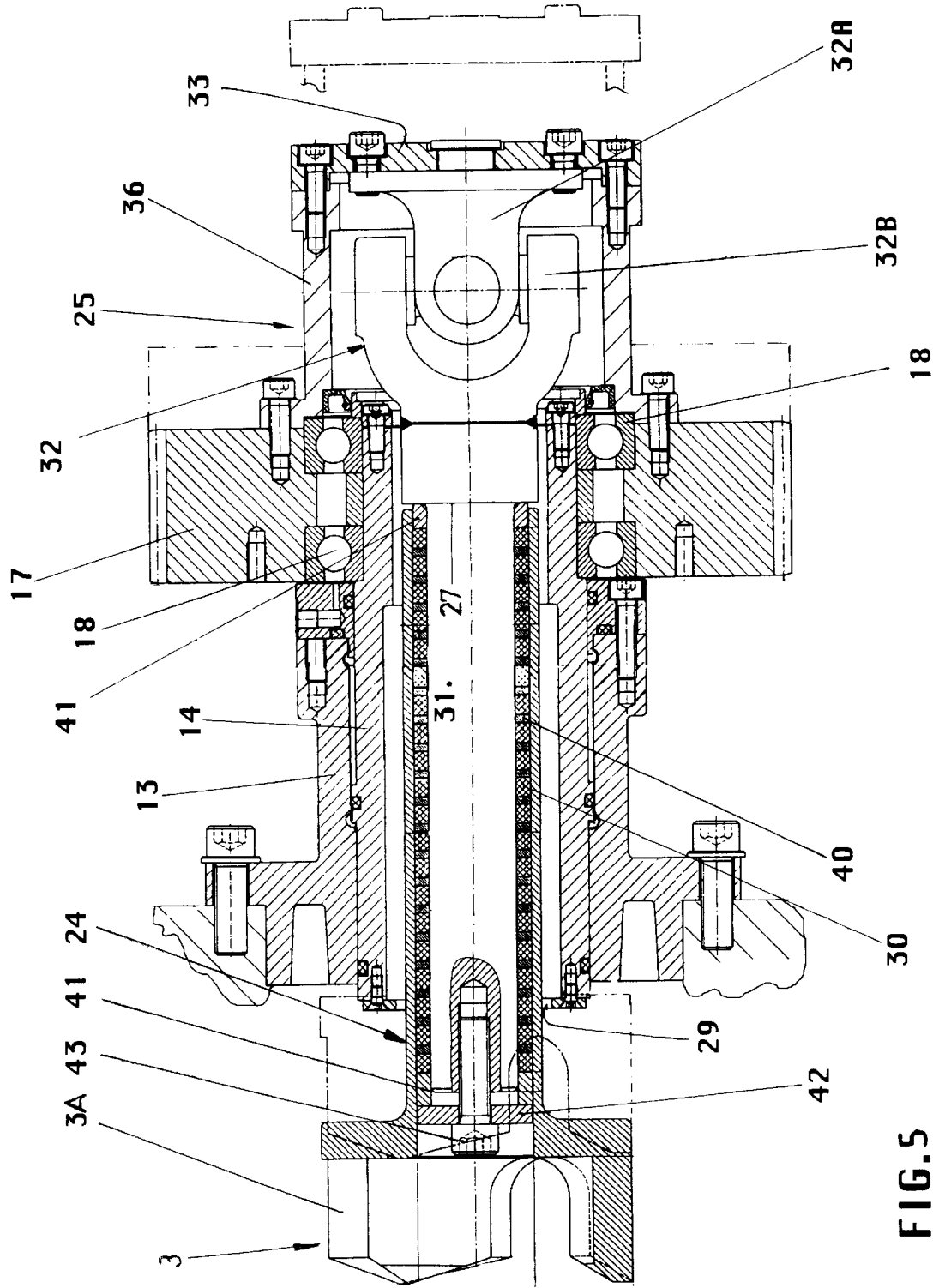
FIG. 5 shows a second exemplary embodiment of a wiping cylinder drive according to the invention, without the parts which belong to the wiping cylinder.

FIG. 5 shows a second exemplary embodiment of a wiping cylinder drive, in which the wiping cylinder, not illustrated, is likewise set in rotation by means of a drive shaft 24 which is independent of the wiping cylinder shaft and which is in the extension of the wiping cylinder shaft and is itself driven by a drive member 25 which is constantly connected kinematically to the main motor of the printing machine. The drive shaft 24 has the form of a hollow shaft and once again passes with radial play through a sleeve 14 which is mounted axially displaceably in a bush 13 of the machine stand and to which said drive shaft is connected via the drive member 25 also described later.

At its end facing the wiping cylinder, the hollow shaft 24 once again carries the input part 3A of a coupling 3, the output part of which is mounted on the wiping cylinder shaft, as in the first exemplary embodiment. The coupling 3, together with its two parts, is designed in exactly the same way as in the first exemplary embodiment. In the coupling position, which is illustrated in FIG. 3 by unbroken lines and in which the drive shaft 24, together with the drive member 25 and the sleeve 14, is displaced to the left, the drive shaft 24 and wiping cylinder shaft are coupled, whereas the wiping cylinder is uncoupled when the drive shaft 24 and the parts connected to it are in the position illustrated in FIG. 3 by dot and dash lines and displaced to the right.

The drive member 25 has a shank 31, on which a relatively large number of rings are slipped, specifically these being alternately arranged elastic tension rings 30 and rigid supporting rings 40. These rings 30, 40 are compressed axially by two thrust rings 41 slipped onto the two ends of the shank 31, and, moreover, a thrust disk 42 is provided at that end of the shank 31 which faces the wiping cylinder, said thrust disk being capable of being prestressed axially by means of a tension screw 43 in the direction facing away from the wiping cylinder. This shank 31, together with said rings, is inserted into the interior of the hollow shaft 24 and, at its end facing away from the wiping cylinder, is mounted in an articulated manner by means of a Cardan joint 32, the drive part 32B of which is connected rigidly to the shank 31.

The drive part 32A of this Cardan joint 32 is connected to an end plate 33, on the outer edge of which is fastened a bush 36 which surrounds the Cardan joint with play. Fastened laterally to this bush 36 is a gearwheel 17 which is mounted rotatably on the sleeve 14 with the aid of the ball bearings 18. As in the first exemplary embodiment, this gearwheel 17 is in engagement with a drive pinion which belongs to the gear leading to the main motor of the printing machine.

The entire drive member 25, which, as mentioned, therefore consists of the shank 31 together with its slipped-on rings, of the Cardan joint 32, of the bush 36 and of the gearwheel 17, is constantly connected kinematically to the main motor of the printing machine.

The subassembly which is axially moveable for coupling to the wiping cylinder therefore comprises the hollow shaft 24, together with the coupling part 3A, the abovedescribed drive member 25 and the sleeve 14 and can be adjusted hydraulically in the same way as described with regard to the first example.

The elastic tension rings 30 seated on the shank 31 are axially prestressed by correspondingly tightening the tension screw 43, the thrust ring 41 seated at the right shank end in FIG. 5 being supported against the inner end face 27 of the Cardan joint 32. The prestress is selected in such a way that the elastic tension rings 30 between the supporting rings 40 are sufficiently deformed radially, in such a way that, in the absence of sudden changes in torque, the hollow shaft 24 coupled to the wiping cylinder shaft is taken up, due to friction, by the rotating shank 31, as in the case of a friction coupling, whereas, in the case of sudden changes in torque, said hollow shaft can slide on the rings 30 and therefore relative to the shank 31, to prevent the drive elements from being overloaded, as in the case of a slip coupling. Normally, therefore, the hollow shaft 24 is taken up due to frictional connection with the shank 31, whilst, in the case of an abrupt change in the load torque, said slipping effect ensures corresponding damping and, at the same time, reduces the level of noise.

As in the first exemplary embodiment too, in which force is transmitted by positive connection, with an elastically deformable gearwheel being interposed, the drives described have the additional advantage that the wearing elements which cause damping, that is to say the gearwheel 20 in the first exemplary embodiment and the elastic tension rings 30 in the second exemplary embodiment, can be exchanged relatively cost-effectively and simply with the least possible effort.

Since the component consisting of the shank 31 together with its rings and of the hollow shaft 24 is mounted on one side by means of the Cardan joint 32, this component is freely pivotable radially about the joint within a limited range and consequently, when in the coupled state, can unconstrainedly follow the wiping cylinder during radial adjustment. In the uncoupled position, once again, the hollow shaft 24 is supported on a supporting ring 29 fastened to the front end face of the sleeve 14.

The invention is not restricted to the exemplary embodiments described, but permits as many variants as regards the design of the drive shaft and drive member and of the damping means.

We claim:

1. A wiping cylinder drive of an intaglio printing machine, comprising a drive shaft setting said wiping cylinder in rotation and a drive member setting said drive shaft in rotation, wherein said drive shaft and said drive member are coaxially coupled to one another through claw coupling with adjacent claws with elastically deformable means being interposed in order to damp sudden changes in load torque, said elastically deformable means comprising a gearwheel made of elastically deformable material with elastically deformable teeth engaging between two adjacent claws of the claw coupling.

2. The wiping cylinder drive as claimed in claim 1, wherein said drive shaft is independent of a shaft of the wiping cylinder and can be coupled to or uncoupled from said shaft by means of a disengageable coupling.

3. The wiping cylinder drive as claimed in claim 2, wherein the drive shaft, at its end facing away from the wiping cylinder, is mounted in an articulated manner on one side, in such a way that when in the coupled state, it can follow a radial adjusting movement of the wiping cylinder.

4. The wiping cylinder drive as claimed in claim 3, wherein two coupling parts of said claw coupling are mounted relative to one another with the aide of a pendulum bearing, in such a way that said drive shaft fastened to said drive part of the coupling is freely pivotable radially within a limited range.

5. The wiping cylinder drive as claimed in claim 1, wherein the drive member, at its end facing kinematically away from the wiping cylinder, carries a gearwheel which is mounted by means of a ball bearing on a sleeve surrounding the drive shaft with radial play and mounted axially displaceably in the machine stand and which is fastened to a bush which surrounds with play that end of the drive shaft which faces away from the wiping cylinder.

6. The wiping cylinder drive as claimed in claim 1, wherein a subassembly consisting of the drive shaft together with the input part of the disengageable coupling, of the drive member and of the sleeve can be displaced axially in the machine stand for the purpose of coupling to the wiping cylinder.

7. A wiping cylinder drive of an intaglio printing machine, comprising a drive shaft setting said wiping cylinder in rotation and a drive member setting said drive shaft in rotation, wherein the drive shaft is a hollow shaft and the drive member has a shank engaging into this hollow shaft so that said drive shaft and said drive member are coaxially coupled to one another through elastically deformable means, said elastically deformable means being inserted as damping elements between the outer circumference of the shank and the inner circumference of the hollow shaft in order to damp sudden changes in load torque.

8. The wiping cylinder drive as claimed in claim 7, wherein a multiplicity of rings, specifically alternately elastic tension rings and rigid supporting rings, are slipped on the shank of the drive member and axially prestressed, in such a way that, in the absence of sudden changes in torque, the hollow shaft is taken up by the rotating shank due to frictional connection, whereas, in the case of sudden changes in torque, said hollow shaft can slide on the elastic tension rings.

9. The wiping cylinder drive as claimed in claim 7, wherein the shank is mounted, at its end facing away from the wiping cylinder, by means of a Cardan joint connected to the drive member, in such a way that the component consisting of the shank and of the hollow shaft is freely pivotable radially about the joint within a limited range.

* * * * *